United States Patent Office 3,400,053
Patented Sept. 3, 1968

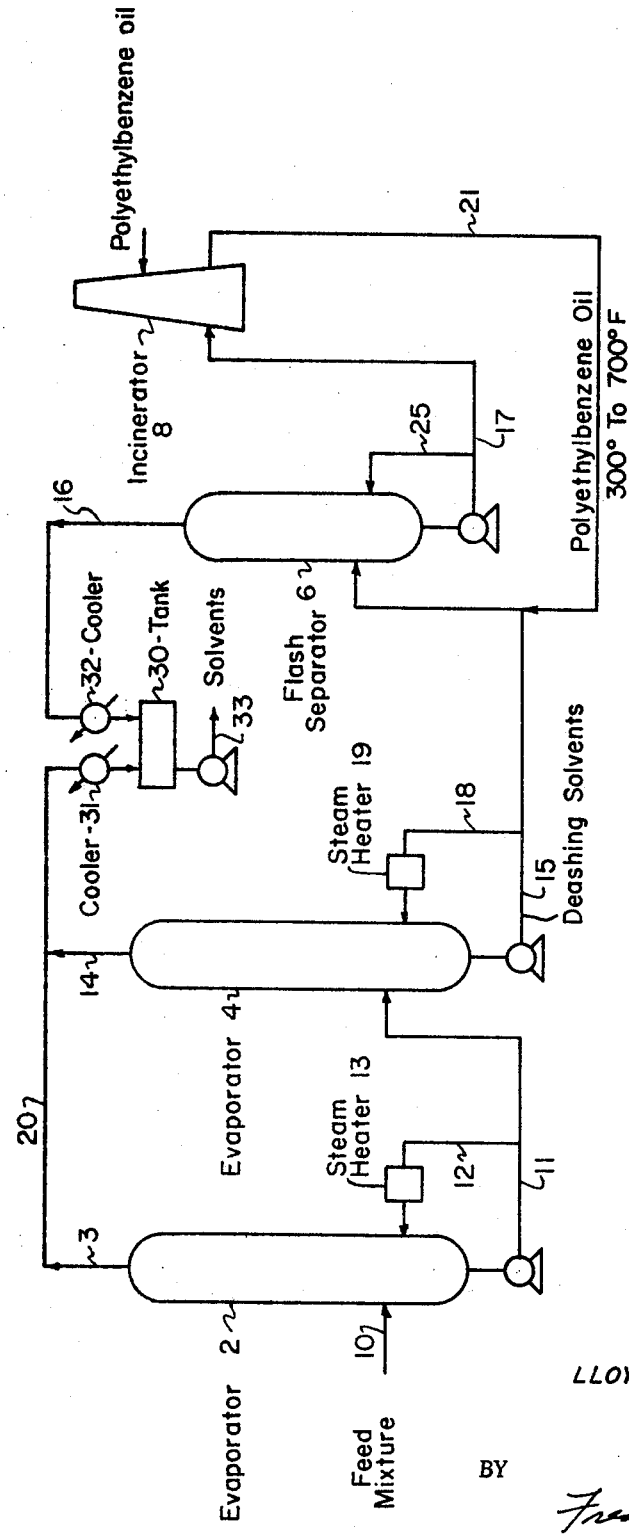

3,400,053
SOLVENT RECOVERY METHOD
Lloyd T. McBeth, Odessa, Tex., assignor to Rexall Drug and Chemical Company, Los Angeles, Calif., a corporation of Delaware
Filed Apr. 15, 1965, Ser. No. 448,390
12 Claims. (Cl. 203—69)

ABSTRACT OF THE DISCLOSURE

The method for recovering deashing solvent from a mixture of the solvent and contaminating impurities is improved by admixing a concentrated mixture of the solvent with a polyethylbenzene oil and heating the new mixture to volatilize the solvent and then separating the solvent from the polyethylbenzene oil containing the impurities.

This invention relates to a novel method for recovering solvents from polymer compositions containing principally low molecular weight polymers and catalyst residues from an alpha-olefin polymerization reaction. More particularly, the invention pertains to a novel method for recovering the solvent components of a deashing mixture containing said solvents, soluble polymers, and catalyst-residue impurities derived from an alpha-olefin polymerization reaction and in particular a polypropylene polymerization system.

In various processes for the synthesis of polymeric products from ethylene, propylene, and higher olefinic compounds or admixtures thereof, the reaction product contains low molecular weight fractions (waxy components) and metal particles or residues which are separated from the solid polymeric product by solvent extraction procedures. These low molecular weight fractions and metal residues are inherently present in most if not all alpha-olefin polymerization reactions, but especially those resulting from the use of organometallic catalysts in the polymerization processes (anionic polymerizations). In the preparation of polyethylene and polypropylene, for example, such catalysts include mixtures of aluminum or lithium aluminum alkyls and titanium or zirconium halides, especially the tetrachlorides and trichlorides. A more detailed description of the catalyst systems will be set forth below.

Regardless of the particular organometallic catalyst system employed, the polymer product, after being separated from the polymerization reaction zone, has been found to contain small percentages of waxy materials and deleterious amounts of metallic catalyst residues. The metallic residues are somehow attached to the polymer chains and, consequently, are difficult, if not impossible, to separate from the polymer product by physical means. In actual practice, both the catalyst residues and low molecular weight polymer fractions are usually removed from the desired polymer product by a so-called "deashing" operation which involves the use of certain solvents and/or diluents which are later separated therefrom either by a simple distillation process or otherwise in order to provide for an economic operation.

The use of water or an alkanol or a hydroxyl-containing compound for treating alpha-olefin polymerization reaction product mixtures, specifically those prepared by using transition metal halide catalysts activated with organometallic reducing agents is well known in the art (see for example U.S. Patent 3,012,023). In accordance with the teachings of the patent literature, the titanium or zirconium metal residues, for example, are converted to esters which are easily extracted. The polymer product, on the other hand, remains in solid form and can be recovered in purified form by filtration or by other known physical separation techniques.

The hydroxyl-containing compounds disclosed by the prior art as operable include water and alkanols having from about 1 to 8 or more carbon atoms per molecule such as methanol, ethanol, propanol, isopropanol, n-butanol, isobutanol, pentanols, hexanols, heptanols, octanols, etc. and mixtures of these with hydrocarbons such as aliphatic normally liquid paraffins. Polyhydroxy compounds such as glycols, ethylene and polyethylene glycols, glycerine, etc. are also useful.

In general, the amount of hydroxyl compound employed will be at least sufficient to deactivate and solubilize all of the catalyst residue present in the polymerization reaction product mixture. The use of excess reactant is, however, preferred and the amount may actually vary up to 4 or 5 or more times the stoichiometric quantities. In general, also, the use of an alcohol for catalyst extraction or solubilization purposes is also carried out in the presence of a hydrocarbon diluent, whether present from the reaction itself or added separately (low molecular weight waxy fractions are usually extracted by the hydrocarbon).

As disclosed above, the desired polymer product is separated from the reaction product mixture following treatment with the hydroxyl-containing compound and hydrocarbon by a centrifuge or filtration step, for example. The resulting filtrate will contain excess hydroxyl-containing compound, solubilized catalyst residues, a minor amount of polymer product or by-products and hydrocarbon diluent used in combination with the hydroxyl-containing compound or during the polymerization reaction. It has been found, for example, that, in the preparation of polypropylene, atactic or waxy polymers will be present in the deashing solvents, whereas the desired isotactic polypropylene product is generally insoluble in these solvents and can be readily recovered therefrom. Inert hydrocarbon solvents or reaction media employed in the polymerization process include materials such as xylene, toluene, benzene, hexane, heptane, isooctane, decane, Decalin, mixtures thereof, as well as liquefied normally gaseous $C_3$ to $C_5$ hydrocarbons, etc.

Hydrocarbon materials can also be present in the filtrate as a result of utilizing a preformed combination of hydroxyl-containing compounds and a hydrocarbon such as an alkane, for polymer deashing and upgrading purposes. A combination of isopropanol and n-heptane has been found to give exceptionally good results in the removal of the catalyst residues present in polypropylene reaction products prepared in accordance with the processes described in the preceding paragraphs and in solubilizing atactic or waxy residues during the deashing operation.

The present invention will be described below primarily, for purpose of convenience, in terms relating to the treatment of polypropylene products and, more particularly, with respect to treatment of the filtrates or solutions recovered following contact between the polypropylene reaction product with a hydroxyl-containing compound alone or in combination with a hydrocarbon such as n-heptane or other alcohol-hydrocarbon compositions which may be azeotropes or compositions approaching azeotropes (hereinafter referred to as "solvents" or "deashing solvents").

An important object of the present invention involves a method for recovery and reuse of the deashing solvents recovered as filtrates following separation of the desired solid polymer product therefrom. The recovery and reuse of deashing solvents provides an economic polymerization process in accordance herewith.

Another object of this invention is to provide a method for readily recovering deashing solvents from the filtrate or solution separated from solid polypropylene products.

A further object of this invention is to provide a method for recovering isopropanol and n-heptane from solutions obtained by employing this mixture in the deashing of polypropylene.

These and other objects of the invention will become apparent from the ensuing description.

In a broad embodiment of this invention there is provided a method for recovering a deashing solvent from an alpha-olefin polymerization system, said solvent being contaminated with low molecular weight polymeric fractions and catalyst residues, said method comprising admixing said solvent with a polyalkylbenzene oil at a temperature of at least about 150° F., vaporizing said solvent therefrom and recovering a polyalkylbenzene oil containing said contaminants.

In the practice of this invention it is preferred to first concentrate the feed solution (herein the deashing solvent containing atactic residues and catalyst particles), which may initially contain less than 5% by weight of total contaminants (including atactic polymer and catalyst residues), to a total solids concentration ranging from about 15 to 70% by weight, and preferably from about 25 to 60% by weight, prior to treatment with the polyalkylated benzene composition. The exact manner of contacting the polyalkylated benzene composition and the concentrated feed solution is not particularly critical, and numerous conventional procedures can be employed without departing from the intended scope of this invention. One such contact method found to be quite useful involves injecting a heated polyalkylated benzene composition ("hereinafter polyethylbenzene") into a stream of the feed solution, and passing the resulting mixture to an evaporation zone, e.g. a flash evaporator, wherein the volatile deashing solvents are vaporized and collected overhead. By operating in accordance with the method of this invention, it has been found that a very high percentage of the deashing solvent is recovered from the feed solution, and the recovered compounds are in substantially purified form. It will be understood, however, that the recovered solvent can be further purified, if this is desired, prior to being recycled to earlier stages in either the recovery steps or in the polymerization reaction process or treatment of the polymer product to effect deashing.

The polyethylbenzene oil containing some volatile component, solubilized impurities, and polymeric material originally present in the feed solution can be removed from the separation or evaporation zone following vaporization of the volatile components and passed to a hold tank for disposal. In accordance with one method of practicing the present invention, the impurity-containing polyethylbenzene oil is passed to an incinerator for final disposal.

The feed mixture, which has been treated in accordance with the preferred method of this invention, comprises the solution or filtrate recovered after the deashing and separation of polypropylene. The feed mixture will contain a major proportion of an alcohol compound and hydrocarbon solvent, preferably isopropanol and n-heptane, solubilized metallic impurities, organic solids which are generally low molecular weight atactic polypropylene fractions.

The metallic impurities present in the feed mixture are the so-called catalyst residues, which have been separated from the polypropylene product by treatment with the alcohol alone or in combination with a heptane solvent. The polymerization catalysts, from which these residues are derived, include those which have been employed in the art to prepare such polymers as polyethylene, polypropylene, higher alphaolefin polymers, and copolymers (see U.S. Patents Nos. 2,962,488 and 3,012,023). The preferred catalysts are, however, prepared from alkyl aluminum compounds such as dialkylaluminum monohalides, triethyl aluminum, triisobutyl aluminum or trioctyl aluminum with a titanium or zirconium compound such as the tetrachlorides or trichlorides. It will be understood, however, that the exact composition of the catalyst residues in the feed mixture is not critical for the present purposes.

As hereinabove noted, the feed mixture will contain varying proportions of polymeric products which are extracted with the treating agents employed. In such a feed mixture obtained from the deashing of polypropylene with an azeotropic combination of isopropanol and n-heptane, minor amounts of atactic polypropylene are present and even some isotactic polypropylene has been detected. The catalyst residues and some inorganic products are also present in the filtrate and all of these components, e.g. the atactic fractions and catalyst residues are considered herein as the contaminating impurities.

The polyethylbenzene oil useful in carrying out the solvent recovery method of this invention can be comprised of mixtures of the following: ethylbenzene, 1,3-diethylbenzene, 1,4-diethylbenzene, 1,2-diethylbenzene, 1,3,5-triethylbenzene, 1,2,4-triethylbenzene, 1,2,3-triethylbenzene, 1,2,4,5-tetraethylbenzene, 1,2,3,5-tetraethylbenzene, 1,2,-3,4-tetraethylbenzene, penta-ethylbenzene, hexa-ethylbenzene, etc. This mixture, herein referred to as polyethylbenzene for simplicity is not limited to any of the above mentioned compounds or proportions thereof, since other alkylated benzenes can be present including lower or higher alkyl components and mixtures of these. The oil (polyethylbenzene) is best defined by its physical properties. Polyethylbenzenes are commercially available and can be a by-product or a direct product of oil refinery operations (see U.S. Patent 3,136,823) and consequently no further reference will be made to methods of manufacture of these compositions.

The particular polyethylbenzene oils preferred for operation of the process of this invention are low viscosity oils with a high boiling point and a high affinity for waxy constituents such as atactic polypropylene. The low viscosity of these compositions enables suitable pumping operation and the high boiling point of the material enables the separation of volatiles therefrom (e.g. isopropanol, hexane, heptane, etc.) by a simple flashing operation. The high affinity for atactic constituents plus the low viscosity of the oils enables greater dissolution of atactic fractions therein while maintaining the ultimate viscosity of the mixture (atactic plus oil) in a pumpable condition. Thus polyethylbenzene completely solubilizes atactic polypropylene at temperatures of around 205° F. when there is present 50 percent by weight of atactic material in the composition. At higher temperatures, for example, up to 250° or 275° F., the mixture is very fluid and even higher amounts of atactic material can be dissolved therein. To illustrate the low viscosity of mixtures of atactic polypropylene and polyethylbenzene, a mixture of 50% by weight of atactic polypropylene was dissolved in polyethylbenzene and viscosity measurements made: at 158° F. viscosity c.p.s.=700; at 176° F. viscosity c.p.s.=450; and at 203° F. the c.p.s. viscosity was 300. These measurements were made using the standard Brookfield viscometer.

A preferred polyethylbenzene for use as a solvent recovery medium herein is an oil having a viscosity of 10 to 100 cps. at room temperature (about 75° F.) as measured on the Brookfield viscometer and initial boiling point above about 350° F., more preferably above 375° F. (polyethylbenzene of this preferred type has a specific gravity of about 0.9115 at room temperature). The viscosity at room temperature, however, can be lower or higher such as from 5 cps. to 1000 cps., while the boiling point can range from an initial one of 300° F. to 450° F., to a 95% point of from 500° to 550° F. The preferred boiling point (initial) range for the polyethylbenzene, however, is about 375° to 400° F.

In practicing the inventive method, it has been found particularly desirable to initially subject the feed mixture to a concentration step wherein the total concentration of contaminants usually less than about 5% by weight, is raised to a level of about 5 to 65%, preferably about 35 to 55% by weight. The concentration can be carried out in conventional equipment such as an evaporator which is heated to the temperatures required dependent upon the nature of the volatile components contained in the feed stream and also upon the pressure of the equipment being used. In a feed stream containing isopropanol and n-heptane as volatile components, the concentration of solids can be effected by heating the evaporator at least to 170° F. and preferably from about 172° to 195° F. The volatiles are condensed and collected and can be either recycled directly or subjected to an intermediate purification treatment, if necessary. This initial concentration of the feed mixture can either be carried out in a single concentration step or by employing a number of sequential steps to facilitate handling, etc.

After being concentrated to the desired level, the feed mixture is next contacted with the polyethylbenzene oil described above. The amount of this oil employed will, in general be at least equal in weight to that of the total contained contaminants, although the exact amount is not considered to be critical and a lesser amount may be utilized, provided it is sufficient to permit the outstanding recoveries of volatile materials from the feed mixture achieved by practicing the method of this invention. The oil is heated to a temperature high enough to allow total vaporization of all solvents contained in the feed, in a vaporizer or flash evaporator, for example, a suitable temperature range being above 190° F. and preferably from 200° F. to about 300° F. The oil is preferably preheated and then introduced into the feed mixture to allow the necessary heat exchange. The volatiles can be substantially totally recovered overhead of the flash evaporator leaving the impurities and the hydrocarbon oil as residues. In the preferred method of carrying out the invention, the polyethylbenzene is preheated to a temperature of about 300° to 700° F., and preferably about 400° to 600° F., prior to being contacted with the feed mixture. The flash evaporator can be operated at a pressure of from 10 millimeters Hg abs. to atmospheric or even super-atmospheric pressures. A preferred pressure range, however, is from about 100 to 150 millimeters Hg abs. The operating pressure of the flash evaporator is important in the practice of this invention as it serves to control bottoms temperature in the flash evaporator, that is, preventing the solubilization of, for example, any isotactic polymer that may be present, specifically at high temperatures such as 220° F., thereby resulting in unmanageable mixtures.

For a more complete understanding of the invention, reference will now be made to the schematic drawing which is one form of the apparatus wherein the recovery method can be carried out. It will readily be apparent, however, that this particular method of operation can be varied without departing from the spirit and scope of the invention as defined in the appended claims.

With particular reference to the drawing, there is provided a first stage evaporator 2, a second stage evaporator 4, a flash separator 6, and an incinerator 8, each of which can comprise equipment that is well known in the art for evaporation, separation and incineration.

In accordance with this invention, the feed mixture is considered as that derived from treating or deashing a polypropylene reaction product. The polymer product, from the polymerization of propylene in the presence of an aluminum alkyl and titanium trichloride, is treated with a combination of isopropanol and n-heptane and the resultant solution or filtrate is passed via line 10 to the lower portion of the first stage evaporator 2, which is operated at a pressure of about 5 p.s.i.g. The feed mixture is heated in a circulating reboiler 13, to a temperature of about 170° to 190° F., and concentrated from about 0.5 to 2% total solids to about 10% total solids. The isopropanol and n-heptane are removed overhead via lines 3 and 20 to tank 30. The bottoms from the first stage evaporator 2 are recycled via line 12 and heater 13 into the lower section of the first stage evaporator 2. The recycled portion of the bottoms is heated to a temperature of about 175° to 190° F. A portion of the bottoms from the first stage evaporator 2 is pumped via line 11 into the lower section of second stage evaporator 4. Sensible and latent heat requirements for the desired volatilization is supplied by heater 13. In the second stage evaporator 4, the feed mixture is subjected to a temperature of about 185° F. to 195° F. by circulation through line 18 and heater 19, and additional isopropanol and n-heptane are recovered overhead via lines 14 and 20 into tank 30, while the feed mixture is concentrated to about 45 to 65% total solids. The thus concentrated feed mixture is removed from the bottom of the second stage evaporator and pumped via line 15 into flash separator 6 after being mixed with polyethylbenzene oil heated to a temperature of about 400° to 600° F.

In flash separator 6, the remaining isopropanol and n-heptane are flashed overhead and passed through line 16 into tank 30. The bottoms from flash evaporator 6 can be circulated via line 25 to the lower section thereof to ensure as high a recovery of the solvents as possible. The bottoms from flash separator 6, which contain the polyethylbenzene oil and the residual feed mixture, if any, are removed via line 17 and pumped into incinerator 8 where they are burned.

As shown in the drawing, the polyethylbenzene oil can be heated by indirect heat exchange in incinerator 8 to about 500° to 600° F. and then fed to the recovery system via line 21. There it is combined with the bottoms product from the second stage evaporator 4 and enters flash separator 6 via line 15.

In further reference to heaters 13 and 19, steam under pressure is used to heat the recycled portions of the bottoms to the aforementioned temperatures. Coolers 31 and 32, on the other hand, are supplied with water to lower the temperature of the recovered solvent stream to about 100° F. to effect condensation. The isopropanol and n-heptane collected in tank 30 may be removed via line 33 and recycled to the deashing operation (not shown) directly or after subjecting them to a conventional purification treatment (not shown) in the event that they are slightly contaminated.

It will be apparent from the foregoing description that a continuous method has been provided to remove atactic residues and catalyst contaminants from the above described feed mixture. Obviously, the initial concentration of the feed mixture to the 25 to 55% total solids level can be effected in a single stage evaporator or, if desired, more than two evaporators can be utilized to attain gradually the desired concentration level.

All of the foregoing percentages are by weight unless otherwise indicated, and a weight of the polyethylbenzene oil about equal to the total weight of contained contaminants is admixed with feed mixture prior to passage into flash separator 6 in order to obtain the desired degree of solvent removal. Pressures employed in the first and second stage evaporators will generally be about 1 to 15 p.s.i.g., and similar pressures will be used in flash separator 6.

The following example will serve to illustrate further the method of this invention.

Example

In apparatus substantially as shown in the drawing a feed mixture containing less than about 5% by weight of atactic polymer and other solids such as catalyst residues was passed through line 10 to evaporator 2, thence line 11 to evaporator 4 and then line 15 to flash chamber 6.

The mixture in line 15 leading to the flash chamber had the following composition in percent by weight:

| Component: | Percent |
| --- | --- |
| Isopropanol | 35.4 |
| n-Heptane | 29.2 |
| Solids [1] | 35.4 |

[1] Includes atactic residues and catalytic materials.

To flash separator 6 was also added polyethylbenzene so that of the combined feed stream from line 15 and line 21 going to the flash separator 6 the polyethylbenzene amounted to about 26 percent by weight, the remainder 74 percent being thus made up of the above noted components.

The flash separator was maintained at a pressure of around 3 p.s.i.a. and a temperature of 180° F.

A 99% by weight recovery of the isopropanol-heptane solvent mixture was realized. To obtain this high degree of recovery, the flash chamber bottoms product was maintained at about a 51% by weight of solids in the polyethylbenzene oil. The bottoms product temperature was observed at about 230° F. while the overhead vapor temperature was recorded at about 180° F.

Further testing was carried out in a laboratory distillation column where the condensed overhead product was water-white and had no odor typical of that of the polyethylbenzene oil. This indicated the ease of the separation to maintain a relatively high purity of the recovered solvents or treating agents (usually above about 95%, that is, 98% and up to 99+%).

One of the advantages of employing a low viscosity-high boiling oil as herein illustrated for purposes of recovering valuable solvent materials and rejection of solid residues is the ease of pumping the slurries and the clean separation obtained upon application of vaporization conditions to the components.

The foregoing data show that the method of this invention can be effectively employed to remove solvent or solvent mixtures from admixtures thereof with contaminating catalyst residues and polymeric materials obtained from known deashing procedures. By operating in accordance with the inventive method, inexpensive materials and uncomplicated equipment as well as a minimum number of steps can be successfully employed, thereby making a major contribution to the economics of the heretofore proposed deashing treatments.

While particular embodiments of this invention are shown above, it will be understood that the invention is obviously subject to variations and modification without departing from its broader aspects. Thus, for example, means other than the incinerator shown in the drawing may be used to dispose of the contaminated hydrocarbon oil recovered from the bottom of flash separator 6, and the hydrocarbon oil may be heated to the desired temperature by means well known to the art.

What is claimed is:

1. In a method for recovering a deashing solvent comprising a hydroxyl-containing compound from a mixture of said solvent and a minor proportion of contaminating impurities, said impurities comprising less than about 5% by weight of the mixture which comprises concentrating by vaporization said mixture to about 5 to 65% by weight of said impurities by heating the mixture to a temperature sufficient to partially volatilize said solvent, the improvement which comprises admixing said concentrated solvent with a polyethylbenzene oil having an initial boiling point of about 300° to 450° F. and heating the resulting mixture to a temperature range of about 150° to 450° F. to volatilize the remainder of the solvent, and separating the thus volatilized solvent from the polyethylbenzene oil containing the impurities.

2. The method of claim 1 wherein said solvent comprises a low molecular weight alcohol.

3. The method of claim 1 wherein the initial feed mixture comprises an alcohol and a hydrocarbon.

4. The method of claim 3 wherein the initial mixture consists essentially of a solvent mixture of isopropanol and n-heptane.

5. The method of claim 1 wherein the contaminating impurities in the deashing solvent are metallic catalyst residues and low molecular weight polymeric materials.

6. The method of claim 4 wherein the polyethylbenzene oil is preheated to a temperature of about 400° to 600° F. prior to being admixed with said concentrated deashing solvent.

7. The method of claim 1 wherein said polyethylbenzene has a cps. viscosity at room temperature of about 5 to 1000.

8. In a continuous method for recovering deashing solvents from a feed mixture comprising a low molecular weight alcohol, a hydrocarbon solvent and contaminating impurities, the impurities comprising less than about 5% by weight of said feed mixture, which comprises heating said feed mixture to a temperature sufficient to volatilize a major proportion of said solvents and to increase the total impurity concentration to betwen about 25 to 55% by weight, the improvement which comprises admixing said concentrated feed mixture with a polyethylbenzene oil having an initial boiling point of about 300° to 450° F. and heating the mixture to a temperature sufficient to volatilize substantially all of the remaining solvents.

9. The method of claim 8 wherein said alcohol is isopropanol and said hydrocarbon solvent is an alkane.

10. In a method for deashing a solid polyolefin product selected from the group consisting of polyethylene, polypropylene, and alpha-olefin copolymers containing metallic catalyst impurities and low molecular weight polymer fractions, which comprises contacting said polyolefin product with a solvent mixture comprising isopropanol and a hydrocarbon diluent to extract said impurities, separating the thus treated solid polyolefin from the resulting solution comprising the alcohol and diluent and said catalyst impurities and low molecular weight polymer fractions, and recovering the alcohol and diluent from said impurities, the improvement which comprises concentrating said mixture to about 25 to 55% by weight total impurity content by heating the mixture to a temperature sufficient to volatilize a major proportion of said alcohol and diluent, contacting the unvolatilized mixture with a polyethylbenzene oil having an initial boiling point within the range of about 300° to 450° F. and which has been preheated to a temperature of about 300° to 600° F. to volatilize the remainder of the mixture, and separating the thus volatilized mixture from the polyethylbenzene oil containing said impurities.

11. The method of claim 10 wherein the solid polyolefin is polypropylene.

12. The method of claim 10 wherein the alcohol and hydrocarbon diluent are recovered in amounts of over 98 percent from their contaminating components.

References Cited

UNITED STATES PATENTS

| | | | |
| --- | --- | --- | --- |
| 2,570,066 | 10/1951 | Morrow et al. | 203—69 |
| 2,962,488 | 11/1960 | Horne | 260—94.7 |
| 3,138,579 | 6/1964 | Cabaness | 260—94.9 |
| 3,311,545 | 3/1967 | Rasmussen | 203—41 |

NORMAN YUDKOFF, *Primary Examiner.*

D. EDWARDS, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,400,053                      September 3, 1968

Lloyd T. McBeth

It is certified that error appears in the above identified patent and that said Letters Patent are hereby corrected as shown below:

Column 8, line 25, "betwen" should read -- between --.

Signed and sealed this 3rd day of February 1970.

(SEAL)
Attest:

Edward M. Fletcher, Jr.                  WILLIAM E. SCHUYLER, JR.
Attesting Officer                         Commissioner of Patents